United States Patent [19]

Puntoni

[11] Patent Number: 4,726,428
[45] Date of Patent: Feb. 23, 1988

[54] AGRICULTURAL TILLAGE UNIT

[76] Inventor: Patrick G. Puntoni, 304 Cemetery, Chenoa, Ill. 61726

[21] Appl. No.: 839,351

[22] Filed: Mar. 13, 1986

[51] Int. Cl.$^4$ .................. A01B 13/12; A01B 49/02
[52] U.S. Cl. ................... 172/177; 172/698; 172/192
[58] Field of Search ............ 172/44, 698, 192, 720, 172/105, 20, 19, 66, 67, 151, 177, 179, 714, 1, 63, 68, 168

[56] References Cited

U.S. PATENT DOCUMENTS

| | | | |
|---|---|---|---|
| 75,858 | 3/1968 | Carstens | 172/67 |
| 969,613 | 9/1910 | Ferris | 172/174 |
| 1,143,204 | 6/1915 | Kilgore | 172/720 X |
| 1,153,213 | 9/1915 | French | 172/67 X |
| 1,518,036 | 12/1924 | Wilkinson | 172/698 |
| 2,190,347 | 2/1940 | Austin | 172/698 |
| 2,323,452 | 7/1943 | Calkins | 172/44 |
| 2,329,794 | 9/1943 | Speck | 172/177 |
| 2,574,385 | 11/1951 | Gilreath | 172/177 |
| 2,660,817 | 12/1953 | Thomas | 172/177 |
| 2,688,910 | 9/1954 | Adair | 172/698 |
| 2,952,322 | 9/1960 | Jurcheck | 172/192 X |
| 3,048,229 | 8/1962 | Simpson | 172/698 |
| 3,202,222 | 8/1965 | Norris | 172/177 |
| 3,340,934 | 9/1967 | Wycoff | 172/63 X |
| 3,360,053 | 12/1967 | Doepker | 172/44 |
| 3,807,507 | 4/1974 | Hecker | 172/192 |
| 3,920,077 | 11/1975 | Lely | 172/67 |
| 4,232,745 | 11/1980 | Viramontes | 172/44 |
| 4,258,635 | 3/1981 | Lutz | 172/177 |
| 4,396,068 | 8/1983 | Handy | 172/44 |

FOREIGN PATENT DOCUMENTS

| | | | |
|---|---|---|---|
| 448326 | 5/1948 | Canada | 172/698 |
| 1029845 | 7/1983 | U.S.S.R. | 172/63 |

Primary Examiner—Richard J. Johnson
Attorney, Agent, or Firm—Fleit, Jacobson, Cohn & Price

[57] ABSTRACT

A minimum upper ground layer and stubble disturbance tillage unit is provided including a pair of dependingly support opposite side plates between whose lower end a horizontally elongated blade assembly is supported with the blade assembly including front and rear marginal portions and disposed in an inclined position with the front marginal portion lowermost and the rear marginal portion uppermost. The blade assembly includes longitudinally spaced V-shaped cutting edges disposed along the forward marginal edge thereof and disposed in a forwardly and downwardly inclined plane generally paralleling the blade assembly. The V-shaped cutting edges are positioned with their apex portions forwardmost and define included angles of graeter than 90°. Rotary members are disposed rearward of the blade assembly and include upper portions spaced above the upper rear marginal edge of the blade assembly. The rotary members are radially aligned with the junctures between pair of adjacent V-shaped blades.

10 Claims, 5 Drawing Figures

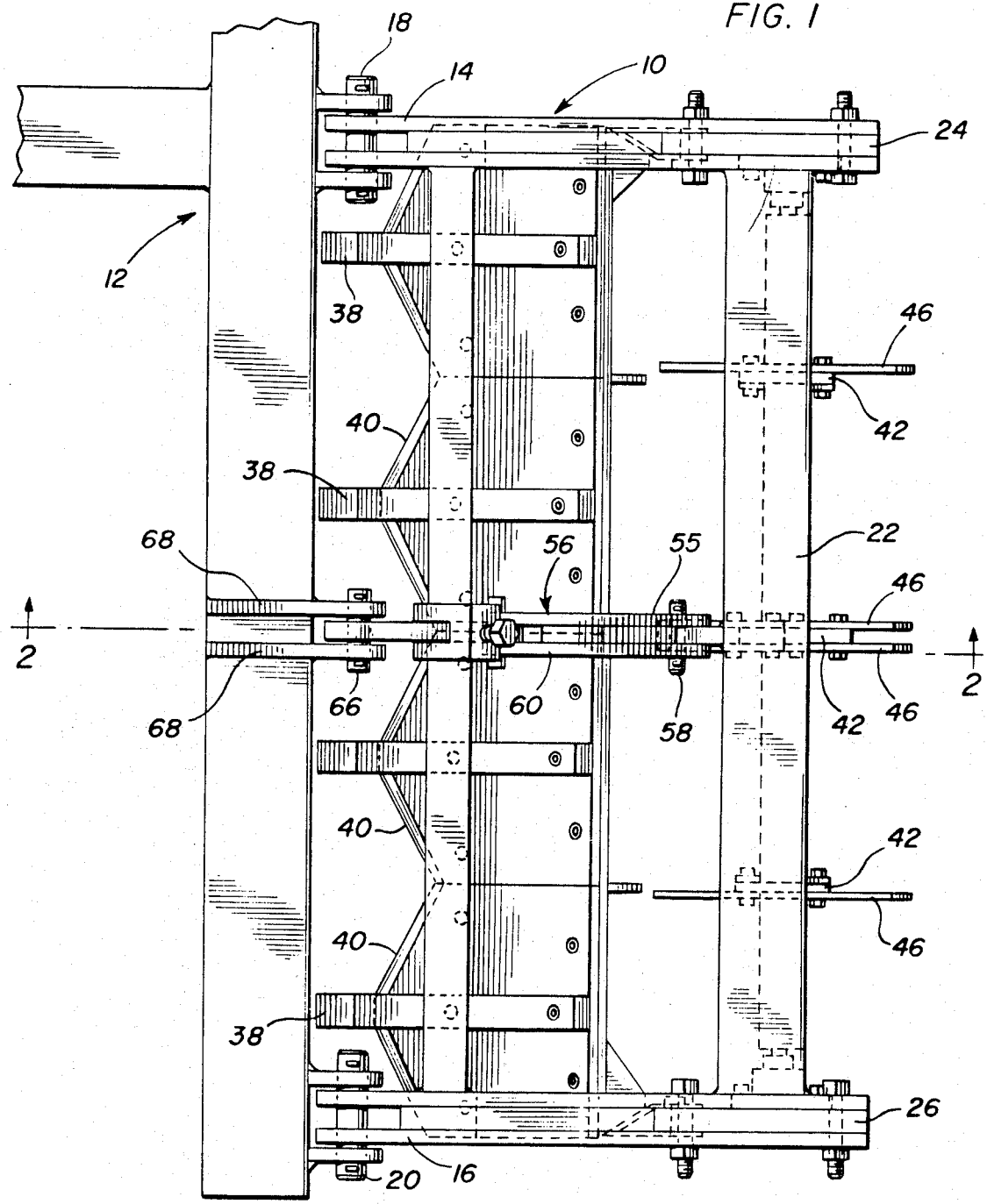
FIG. 1
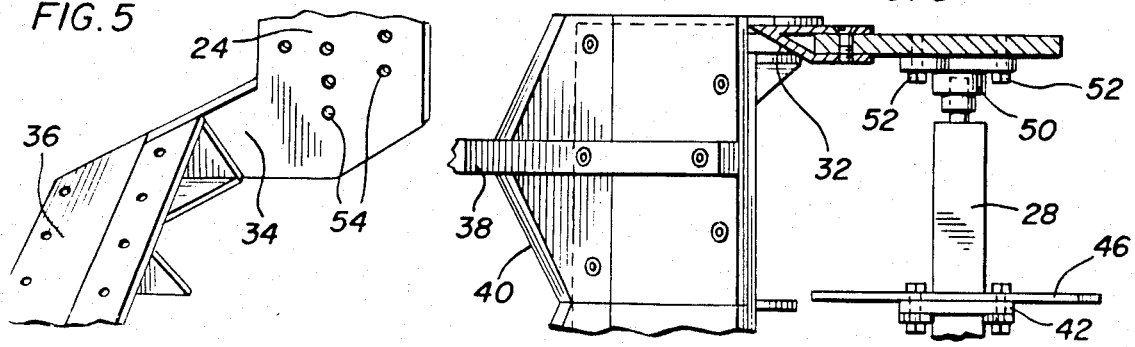
FIG. 5
FIG. 3

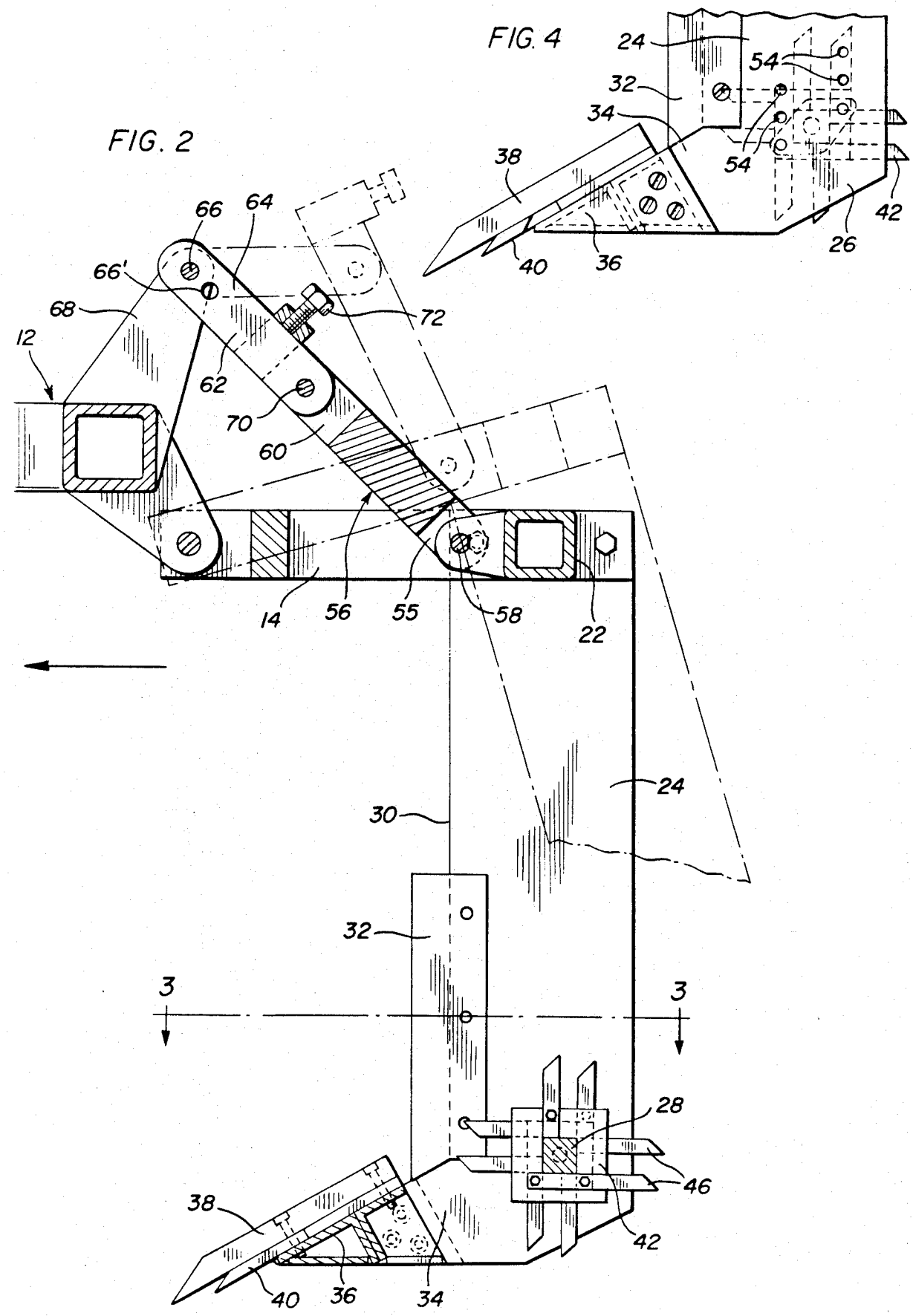

AGRICULTURAL TILLAGE UNIT

BACKGROUND OF THE INVENTION

1. Field of the Invention

This invention relates to a tillage unit whose purpose is to till the entire soil profile within the units' operating range and with minimum soil surface and crop residue disturbance.

2. Description of Related Art

Different forms of tillage units incorporating some of the general structural and operational features of the instant invention are disclosed in U.S. Pat. Nos. 1,518,036, 2,190,347, 2,329,794, 2,574,385, 2,660,817, 2,688,910, 3,048,229 and 3,202,222. However, these previously known forms of implements do not include the overall combination of structural features of the instant invention which coact to perform the desired tillage operation in an improved manner.

SUMMARY OF THE INVENTION

The tillage unit of the instant invention is designed to cut, lift and break up (from beneath) the upper layer of soil and to thereafter allow the broken up soil to be fall back down onto the ground in substantially its original position with the upper surface crop residue on the soil substantially undisturbed for soil conservation.

With the increased interest in conservation tillage and the mounting concern over deep soil compaction, there is an established need for a tillage apparatus that can till soil to greater depths while keeping the surface relatively intact to prevent soil erosion.

Most popular machines currently being used for this purpose consist of multiple shanks (usually chisel or ripper) closely spaced in various arrangements on a carrier frame. These shanks are used by themselves or in combination with cutting tips which will give different degrees of soil displacement and/or crop residue incorporation, depending upon the particular design, combination or configuration used. When these multiple shanks are drawn through the soil, they make a series of gashes in the soil, relying upon shattering action of the soil between the shank gashes to till the soil between the shanks. These shank-type machines have several inherent drawbacks.

Tillage machines utilizing mostly spaced shanks cause considerable soil disturbance and usually a rigiding effect. Further, the closely spaced shank-type machines require a substantial amount of pulling horsepower which varies considerably according to the type of soil and the amount of soil actually displaced and/or broken up. Further, multiple shank-type machines function inconsistently in breaking up the soil between the gashes formed in the ground by the shanks and under some soil conditions, there is substantially no breaking up of the soil between adjacent shanks resulting in substantially no tillage of the ground, even though considerable horsepower is consumed.

The tillage unit of the instant invention utilizes a substantially fewer number of shanks protruding into the soil, thereby reducing soil disturbance and soil surface crop residue disturbance. Further, because of the considerably smaller number of shanks, the tillage unit is operable to displace considerably more soil while using a reduced amount of horsepower. Further, the tillage unit of the instant invention may be readily accommodated on a tractor three point lift hitch and incorporates operating components which may be readily maintained and/or replaced due to wear.

Also, the tillage unit of the instant invention can be manufactured in various sizes (primarily different widths) to accommodate many different mounting arrangements, tractor sizes and tillage operations. The tillage units can be mounted singly or in gang configuration, depending upon the frame arrangement or operating width desired. The tillage unit also can be used in combination (either on the same frame or with a separate operation) with existing tillage equipment if additional soil disturbance or residue incorporation is necessary, or desired.

The tillage unit may be adjusted at various points to accommodate a wide variety of field conditions encountered.

Furthermore, the tillage unit includes ground ripping and cutting features which operate independent of a plowsole. The tillage unit, to the contrary, tills the soil in a "serrated" fashion to prevent a plowsole.

The main object of this invention is to provide a tillage unit which will be capable of tilling soil to a desired depth with minimum soil disturbance and crop residue disturbance.

Still another object of this invention is to provide a tillage unit requiring a minimum amount of horsepower to accomplish the desired soil tilling operation.

Another important object of this invention is to provide a tillage unit constructed in a manner to perform the desired tillage operation under varying soil conditions.

Yet another object of this invention is to provide a tillage unit upon which maintenance and repair operations may be readily carried out.

Still another important object of this invention is to provide a tillage unit in accordance with the preceding objects and which may be constructed in various sizes and mounted singly or in gang configuration.

Another important object of this invention is to provide an agricultural tillage unit including adjustment features thereof enabling the tillage unit to be adjusted to perform the tillage operation in various different soils.

Still another object of this invention is to provide an agricultural tillage unit having adequate ground depth penetration and which is capable of performing the desired tillage operation in a "serrated" fashion to prevent a plowsole.

A final object of this invention to be specifically enumerated herein is to provide an agricultural tillage unit in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the tillage unit of the instant invention;

FIG. 2 is a vertical sectional view taken substantially upon the plane indicated by the section line 2—2 of FIG. 1 and with a "tripped" position of the unit fragmentarily illustrated in phantom lines;

FIG. 3 is a fragmentary horizontal sectional view taken substantially upon the plane indicated by the section line 3—3 of FIG. 2;

FIG. 4 is a fragmentary elevational view of the left side of the ground engaging portion of the implement; and FIG. 5 is a fragmentary perspective view of the lower inside portion of the right-hand side of the ground engaging portion of the unit with the corresponding wear sleeve, cutting blades and ripper teeth removed.

DESCRIPTION OF THE PREFERRED EMBODIMENT

Referring now more specifically to the drawings, the numeral 10 generally designates the tillage unit of the instant invention. The tillage unit 10 includes a carrier frame referred to in general by the reference numeral 12. The carrier frame 12 may comprise a single unit supported from the three point lift hitch of a tractor, or may comprise the main frame for a plurality of tillage units 10 arranged in gang fashion, such a main frame being provided with support wheels (not shown) of the vertically adjustable type.

The unit 10 includes a pair of double arm support arm assemblies 14 and 16 projecting rearwardly from the frame 12 and having their forward ends removably pivotally supported from the frame 12 as at 18 and 20. An upper transverse beam 22 extends between and is supported at its opposite ends from the rear ends of the support arm assemblies 14 and 16 and a pair of opposite side support shanks or plates 24 and 26 depend downwardly from the rear ends of the support arm assemblies 14 and 16. The upper ends of the plates 24 and 26 are secured between the rear ends of the double arms of the support arm assemblies 14 and 16, respectively, and the lower ends of the plates rotatably journal the opposite ends of a support shaft 28 extending therebetween. Further, the lower portions of the forward marginal edges 30 of the plates 24 and 26 have removable soil divider wear sleeves 32 supported therefrom and the lower ends of the plates 24 and 26 include forwardly projecting mounting portions 34 between which a lower cross support structure 36 is supported, see FIGS. 2 and 5.

The cross support structure 36 removably mounts a plurality of forwardly and downwardly inclined ripper teeth therefrom with the ripper teeth 38 spaced apart transversely of the unit 10 and longitudinally of the cross support structure 36. In addition, the cross support structure 36 also removably mounts a plurality of forwardly and downwardly inclined cutting blades 40 therefrom with the cutting blades 40 also being spaced transversely of the unit 10 and longitudinally of the cross support structure 36.

The shaft 28 mounts a plurality of axially spaced shatter wheels or rotary deflectors 42 supported therefrom. The rotary deflectors 42 each include sets of axially spaced outwardly projecting tines 46 supported therefrom.

The opposite ends of the shaft 28 are mounted from journals 50 supported from the plates 24 and 26 and the journals 50 are vertically adjustable along the plates 24 and 26 through the utilization of mounting bolts 52 which may be secured through vertically spaced sets of mounting bores 54 formed in the plates 24 and 26. Accordingly, the level of the upper peripheries of the rotary deflectors 42 may be adjusted relative to the rear upper extremities of the ripper teeth 38 and blades 40.

The longitudinal midportion of the transverse beam 22 removably pivotally mounts a first end 55 of an elongated safety trip arm assembly 56 therefrom as at 58. The trip arm assembly 56 includes a pair of elongated opposite side links 60 defining the first end 55 and elongated link 62 defining the second end 64 of the assembly 56. The second end 64 is removably pivotally anchored as at 66 between a pair of upstanding mounting flanges 68 carried by the frame 12 and the adjacent ends of the links 60 and 62 are pivotally interconnected as at 70. Further, the link 60 includes an adjustable abutment 72 with which the link 62 is engageable. The assembly 56 is swingable to at least the phantom line position thereof illustrated in FIG. 2 should the ripper teeth 38 or cutter blades 40 impact with a subsurface rock or root. When the assembly 56 is in the phantom line position of FIG. 1, the lower end of the unit 10 from which the ripper teeth 38 and cutting blades 40 are supported is pivoted rearwardly and upwardly.

In operation, the lower end of the unit 10 is advanced through the ground below the surface thereof. The surface of the ground may be disposed generally along the section line 3—3 in FIG. 2 and the ripper teeth 38 and cutting blades 40 will shear the upper layer of the ground between the plates 24 and 26 from the remainder of the ground disposed therebelow and the sheared upper layer of the ground will pass rearwardly and upwardly over the ripper teeth 38 and cutting blades 40 and be acted upon by the rotary deflectors 42 to shatter or break up the upper ground layer passing thereover. However, the shattering and breaking up action carried out by the rotary deflectors 42 merely causes fractures in the soil layer passing thereover and allows the soil layer to be deposited back upon the ground with minimal disturbance thereof. In addition, only two plates 24 and 26 penetrate the ground to the shear level and there is little disturbance of the upper soil layer by the plates 24 and 26 due to their thinness and the forwardly tapering wear sleeves 32 carried by the forward marginal edges 30 thereof.

Ground stubble, if any, is substantially undisturbed and the ripper teeth 38 and cutting blades 40 shear the upper ground layer from the ground disposed therebelow along a serrated path to prevent a plowsole.

In addition to the serrated path of shear of the upper portion of the ground from the ground disposed therebelow preventing a plowsole, inasmuch as the cutting blades 40 are V-shaped in configuration with their apices aligned with the associated ripper teeth 38, and because a plurality transversely spaced V-shaped cutter blades 40 are utilized, the upper ground level which is sheared from the remainder of the ground disposed therebelow includes alternating deeper and shallower sheared portions of the ground. As these alternating deeper and shallower portions of the sheared ground pass rearwardly and upwardly over the blade assembly defined by the cross support structure, the blades 40 and the ripper teeth 38, the sheared layer of ground is automatically broken up to a great extent and the rotary deflectors 42 merely insure that the breaking up or shattering of the sheared ground layer is complete, note that the rotary deflectors are aligned with those parallel paths extending in the direction of movement of the tillage unit 10 defined between pairs of adjacent cutter blades 40. In addition, as hereinbefore set forth, the height of the axis of rotation of the rotary deflectors 42 may be varied. Further, the assembly 56, in addition to being adjustable through utilization of the adjustable abutment 72, also may be adjusted by utilizing the transverse bore 66' formed through the link 62 for the pivot connection at 66, see FIG. 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tillage unit designed to perform a tillage operation with minimum upper ground layer and stubble disturbance, said unit including a generally U-shaped assemblage incorporating (1) a pair of laterally spaced apart upright generally parallel plates including upper and lower ends and corresponding front and rear longitudinal marginal portions and (2) an elongated lengthwise continuous and generally horizontal and upwardly inclined blade assembly lengthwise extending between and interconnecting the lower ends of said plates, said blade assembly including front and rear longitudinal margins, said front longitudinal margin defining successive at least closely adjacent and substantially V-shaped cutting edge portions spaced therealong with their apex portions spaced forwardmost, said rear longitudinal margin being generally longitudinally straight, said blade assembly including generally straight front-to-rear extending inclined flat upper surface portions extending between said margins and being disposed with said rear longitudinal margin elevated relative to said front longitudinal margin, elongated transverse horizontal bar means supported at a predetermined level above the ground and to have draft forces applied thereto for advancing said bar means in a lateral direction over the ground, means mounting the upper ends of said plates from said bar means at points spaced longitudinally therealong, a plurality of laterally spaced apart rotary members disposed to the rear of said blade assembly and axially spaced apart along the latter, journal means journalling said rotary members from said assembly for free rotation about axes generally paralleling said blade assembly and with at least the upper portions of said rotary members projecting above and disposed rearwardly of the upper rear longitudinal margin of said blade assembly and the lower portions of said rotary members spaced above the lower front longitudinal margin of said blade assembly.

2. The tillage unit of claim 1 wherein said rotary members include generally radially outwardly projecting circumferentially spaced teeth.

3. The tillage unit of claim 1 wherein said journal means includes elongated shaft means extending between and journalled from the lower ends of said plates spaced rearward of said blade assembly and from which said rotary members are mounted.

4. The tillage unit of claim 1 wherein at least the lower portions of the front longitudinal margins of said plates include bevelled ground slicing edges.

5. The tillage unit of claim 1 wherein said journal means includes means for vertically adjusting said axes.

6. A tillage unit designed to perform a tillage operation with minimum upper ground layer and stubble disturbance, said unit including a generally U-shaped assemblage incorporating (1) a pair of laterally spaced apart upright generally parallel plates including upper and lower ends and corresponding front and rear longitudinal marginal portions and (2) an elongated and lengthwise continuous and generally horizontal blade assembly lengthwise extending between and interconnecting the lower ends of said plates, said blade assembly including front and rear longitudinal margins and being disposed in an inclined position with said rear longitudinal margin elevated relative to said front longitudinal margin, said front longitudinal margin defining successive at least closely adjacent and substantially V-shaped cutting edge portions spaced therealong with their apex portions spaced forwardmost and with said V-shaped cutting edge portions defining including angles of greater than 90° and disposed in a forwardly and downwardly inclined plane, a plurality of laterally spaced apart rotary members disposed to the rear of said blade assembly and axially spaced apart along the latter, journal means journalling said rotary members from said U-shaped assemblage for rotation about axes generally paralleling said blade assembly and with at least the upper portions of said rotary members projecting above the level of the rear longitudinal marginal portion of said blade assembly, said rotary members being generally radially aligned with the zones between pairs of adjacent V-shaped cutting edge portions.

7. The tillage unit of claim 6 wherein the altitude of said V-shaped cutting edges is generally one-quarter the extent of said V-shaped cutting edge portions as measured longitudinally of said blade assembly.

8. The tillage unit of claim 6 wherein said rotary members include radially outwardly projecting circumferentially spaced teeth.

9. The tillage unit of claim 6 wherein said journal means includes elongated shaft means extending between and journalled from the lower ends of said plates and spaced rearward of said blade assembly and from which said rotary members are mounted.

10. The method of land tillage with minimum soil and stubble disturbance while effecting soil cake breakup, said method comprising:
    (a) shearing the upper layer of ground from the remaining ground thereunder in a serrated fashion of alternating high and low depths along a shear zone extending continuously of a ground swath of predetermined width through the utilization of an elongated longitudinally continuous laterally advanced shear blade assembly extending transversely of said swath, of a length substantially equal to said width and with the blade assembly supported at its opposite ends by upright support plates disposed in upstanding planes paralleling said swath;
    (b) passing said sheared layer upwardly over an inclined generally flat surface thereby elevating alternate high and low depth zones of the sheared ground layer to distinctively low and high elevations relative to the original depth of shear of said zones from the remaining ground thereunder with adjacent alternate high and low elevated zones of sheared ground layer being broken from each other along paths extending longitudinally along and spaced laterally apart transversely of said swath; and,
    (c) allowing said zones of sheared ground to fall by gravity back down upon said remaining ground thereunder.

* * * * *